US012729786B2

(12) United States Patent
Arrigoni et al.

(10) Patent No.: US 12,729,786 B2
(45) Date of Patent: Sep. 8, 2026

(54) APPARATUS AND METHOD FOR MONITORING AND MANAGING THE CONNECTION AND OPERATION OF LINES OF A HYDRAULIC SYSTEM

(71) Applicant: Faster S.r.l., Rivolta d'Adda (IT)

(72) Inventors: Riccardo Arrigoni, Rivolta d'Adda (IT); Andrea Daniele, Reggio Emilia (IT); Paolo Rusconi, Rivolta d'Adda (IT); Luca Troisi, Turin (IT); Alessandro La Placa, Chivasso (IT); Enrico Torazza, Turin (IT); Matteo Seghieri, Bergamo (IT); Emiliano Torresi, Cernusco sul Naviglio (IT)

( * ) Notice: Subject to any disclaimer, the term of this patent is extended or adjusted under 35 U.S.C. 154(b) by 389 days.

(21) Appl. No.: 18/552,183

(22) PCT Filed: Mar. 25, 2022

(86) PCT No.: PCT/IB2022/052747
§ 371 (c)(1),
(2) Date: Sep. 24, 2023

(87) PCT Pub. No.: WO2022/208258
PCT Pub. Date: Oct. 6, 2022

(65) Prior Publication Data
US 2024/0295280 A1 Sep. 5, 2024

(51) Int. Cl.
*F16L 35/00* (2006.01)
*F16L 37/28* (2006.01)

(52) U.S. Cl.
CPC ............... *F16L 35/00* (2013.01); *F16L 37/28* (2013.01); *F16L 2201/10* (2013.01); *F16L 2201/60* (2013.01)

(58) Field of Classification Search
USPC .......................................................... 702/188
See application file for complete search history.

(56) References Cited

U.S. PATENT DOCUMENTS 10,677,680 B1 6/2020 Ortega Gutierrez
2005/0211934 A1* 9/2005 Garber .................. B67D 7/348 251/129.01
2007/0001450 A1* 1/2007 Swift ...................... F16L 37/06 285/321

(Continued)

FOREIGN PATENT DOCUMENTS

EP 3353456 8/2018
EP 3567294 11/2019

(Continued)

*Primary Examiner* — Paul D Lee
(74) *Attorney, Agent, or Firm* — Themis Law

(57) ABSTRACT

An apparatus for monitoring and managing the connecting steps and the operation of the hydraulic lines of a system, which includes an operating machine having a hydraulic circuit, a utility, and a plurality of hydraulic lines for connecting a utility to the operating machine, and a method of monitoring and managing the connection and operation of the hydraulic lines of the apparatus. More particularly, the present invention relates to oil-hydraulic applications and provides a novel system for recognizing and managing hydraulic lines, namely, quick couplings that establish connection of the hydraulic lines of a utility to the hydraulic circuit of an operating machine.

9 Claims, 4 Drawing Sheets

(56) References Cited

U.S. PATENT DOCUMENTS

| | | | | |
|---|---|---|---|---|
| 2015/0186837 | A1* | 7/2015 | Bianco | B60P 3/2245<br>235/381 |
| 2016/0061370 | A1* | 3/2016 | Gennasio | F16L 37/34<br>251/58 |
| 2017/0089496 | A1* | 3/2017 | Lennon | F16L 13/146 |
| 2020/0340608 | A1* | 10/2020 | Danelli | F16L 37/28 |

FOREIGN PATENT DOCUMENTS

| | | |
|---|---|---|
| EP | 3742040 | 11/2020 |
| GB | 2560612 | 9/2018 |
| GB | 2564757 | 1/2019 |
| WO | 2020208480 | 10/2020 |

* cited by examiner

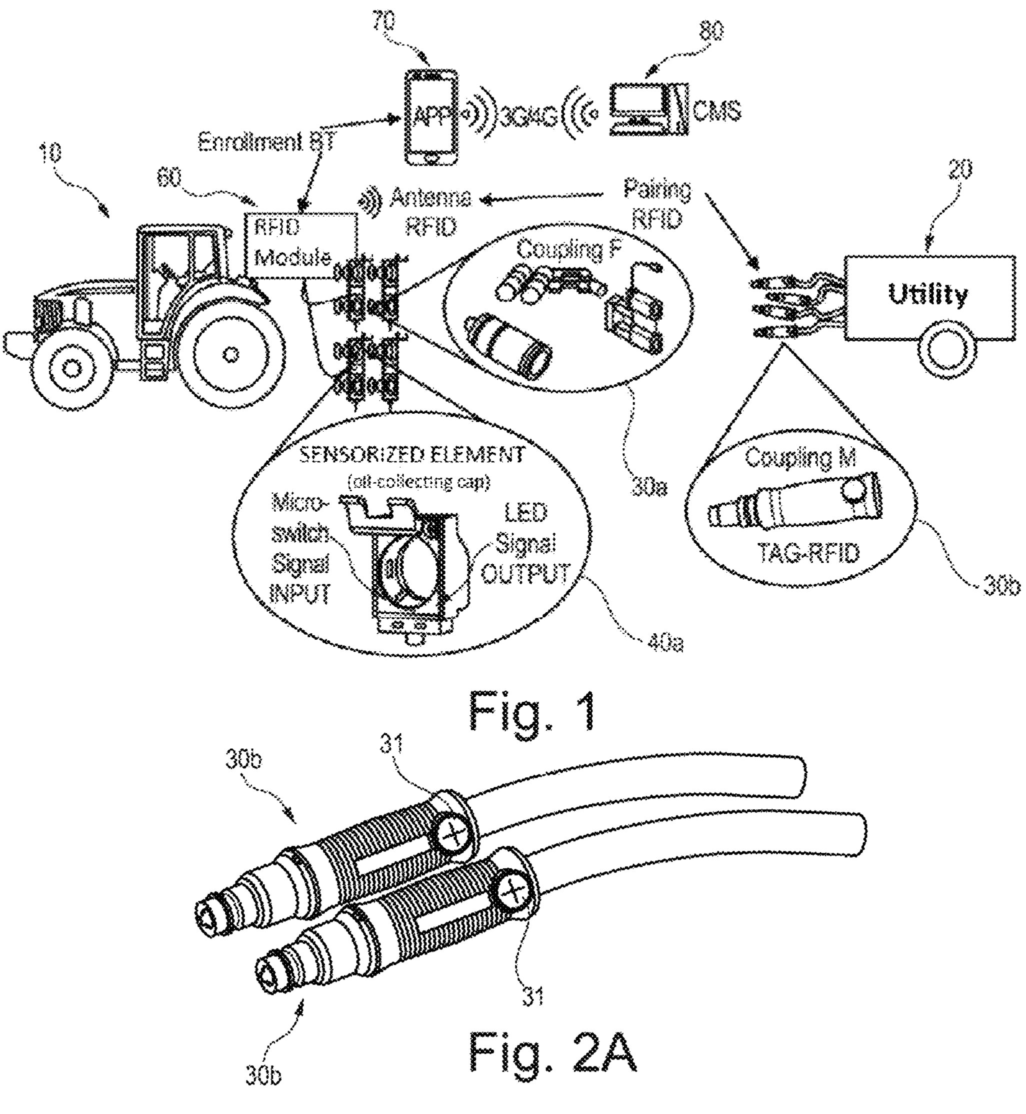
Fig. 1
Fig. 2A
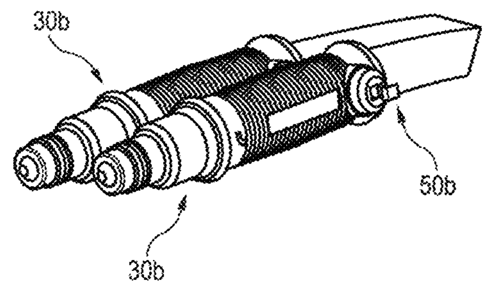
Fig. 2B

APPARATUS AND METHOD FOR MONITORING AND MANAGING THE CONNECTION AND OPERATION OF LINES OF A HYDRAULIC SYSTEM

FIELD OF THE INVENTION

The present invention relates to an apparatus for monitoring and managing the connecting steps and the operation of the hydraulic lines of a system comprising an operating machine which comprises a hydraulic circuit, a utility and a plurality of hydraulic lines for connection of said utility to said operating machine.

The present invention also relates to a method of monitoring and managing the connection and operation of the hydraulic lines of said apparatus.

Specifically, the present invention relates to oil-hydraulic applications and provides a novel system for recognizing and managing hydraulic lines, namely quick couplings that establish connection of the hydraulic lines of a utility to the hydraulic circuit of an operating machine.

BACKGROUND OF THE INVENTION

In many fields, for example in agriculture, an operating machine having an on-board hydraulic circuit, namely an oil-hydraulic circuit, is connected to a utility via hydraulic lines and male and female couplings, which establish a quick and reversible connection, thereby allowing the utility to be quickly and safely connected to and disconnected from the operating machine.

Reference will be generally made hereinafter to a hydraulic circuit and hydraulic lines to refer to circuits and lines for pressurized oil, and hence more specifically to oil-hydraulic circuits and lines.

The utility is generally equipped with primary pipes ending with a male coupling and the machine comprises ports having female couplings, or hydraulic blocks or manifolds supporting female cartridges.

Technical solutions have been developed in the art for identifying the hydraulic lines, in view of assisting the user to establish correct machine/utility connections.

Line identification generally relies on simple visual recognition elements, such as colored identification labels, or tags with symbols representing the function or identification numbers, letters or other similar indications whereby the user is guided in correctly matching each hydraulic pipe of the utility and the corresponding port on the machine, namely by connecting each male coupling of the hydraulic lines of the utility to the correct port, coupling or female cartridge, on the machine side.

Such prior art solutions still suffer from a number of drawbacks.

A first drawback consists in that identification numbers are often lost during use of the machine and/or the utility.

That is, during the life of the machine and of the tool, the colored labels or tags bearing the symbols or identification codes can detach from the supports, e.g. the hand grips for the pipes of the hydraulic lines of the utility, and the tops of the plugs that close the ports of the female couplings and/or on the operating machine. This will cause the loss of the indications about the male-female coupling match.

With colored labels or labels bearing written indications, a drawback is that the labels degrade and/or the colors are discolored by the effect of the environmental and/or chemical agents contacted thereby (dirt, solar exposure, and so on) losing their effectiveness in identifying the line.

All known solutions based on physical identification codes, such as colors, symbols and so on, also have the drawback of only guiding the user in matching the pipes of the utility-side hydraulic lines to the operating machine-side ports for one implement with respect to a machine. When matching the same implement to a different machine (as required for instance in the case of fleets of agricultural machines comprising several operating machines and/or equipment or utilities) the color configuration of the utility or the machine would need to be changed.

Also, no solution has been known heretofore to provide the user and/or the manufacturer of the coupling that is used to form the hydraulic connection of the utility and machine lines, with information concerning the way of using the coupling, that can be employed, for example for predictive maintenance.

SUMMARY OF THE INVENTION

In view of the foregoing, the purpose of the present invention is to provide an apparatus and a method for monitoring and managing the connection steps and the operation of the hydraulic lines forming the connection between an operating machine and a utility, that can obviate the drawbacks of known prior art solutions.

Within this technical purpose, the object of the present invention is to provide an apparatus for managing hydraulic connection operations, with a multitude of hydraulic lines to be coupled (between the operating machine and a respective implement to be connected) and/or in the case of hardly identifiable/recognizable hydraulic lines due to substantial uniformity of the coupling sizes through the various lines and/or types of couplings, i.e. due to the lack of visual indicia.

A further object of the present invention is to allow the user to manage fleets of a large number of operating machines and implements/utilities, by being able to store a plurality of indicia for a corresponding plurality of customized connections for specific machine/utility matches.

The provision of a library storing correct matching indications allows easy transfer of the information generated by an “expert” operator during setup of a machine, whereby a multitude of end users, possibly non-expert users, can be guided by the system to fail-safely replicate the correct connection.

The above discussed purpose and these and other objects as more clearly explained below are fulfilled by an apparatus for monitoring and managing correct connection and operation of the hydraulic lines of a machine/utility connection as defined in claim 1, and by a method of monitoring and managing correct connection and operation of the hydraulic lines that form the hydraulic machine/utility connection as defined in claim 9.

Further characteristics of the apparatus and method for monitoring and managing correct connection and operation of the hydraulic lines of a machine/utility connection according to the present invention are indicated in the dependent claims, which also form an integral part of the present disclosure.

LIST OF FIGURES

Further characteristics and advantages will be better explained from the description of preferred but not exclusive embodiments of the apparatus and method for monitoring and managing correct connection and operation of the hydraulic lines of a machine/utility connection according to the present invention, as shown by way of a non-limiting example with the help of the accompanying drawings, in which:

FIG. 1 shows a general diagram of the apparatus for monitoring and managing correct connection and operation of the hydraulic lines of a machine/utility connection according to the present invention;

Figure 2C:
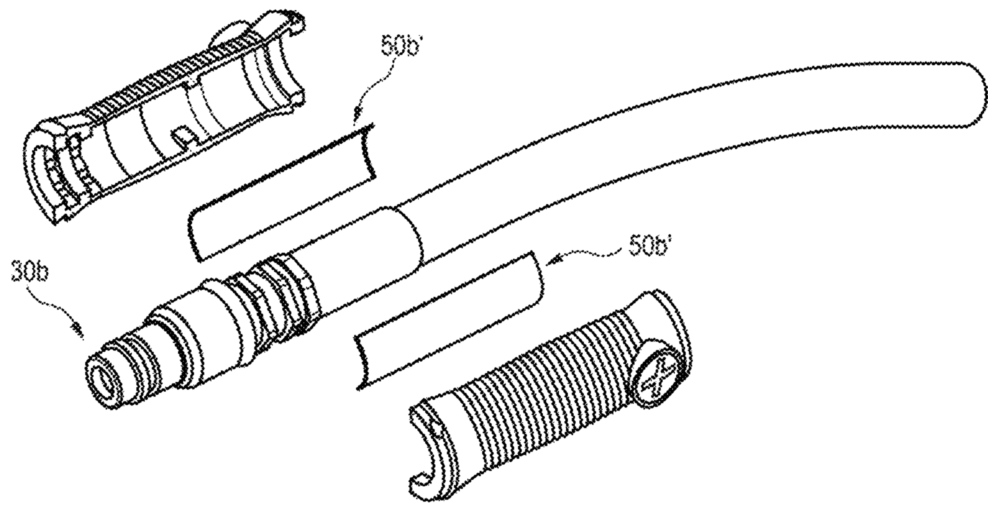
FIG. 2A shows an example of prior art male coupling identification means, which use an identification insert with a different color for each line.
Figure 3A:
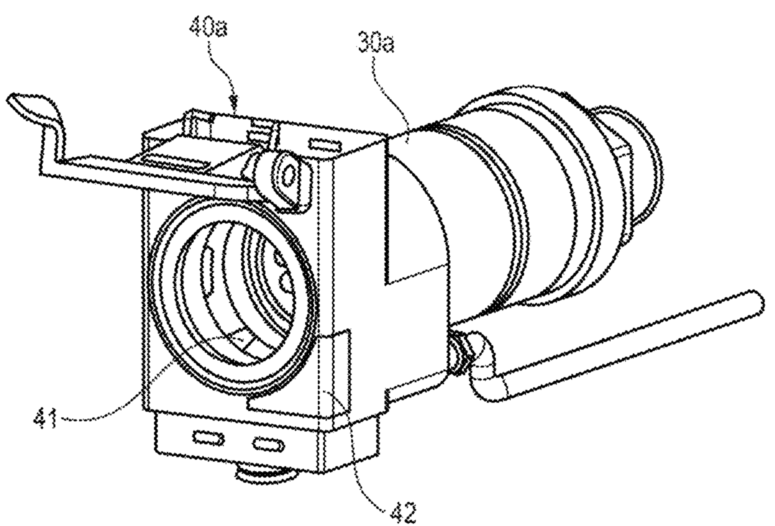
Figure 3B:
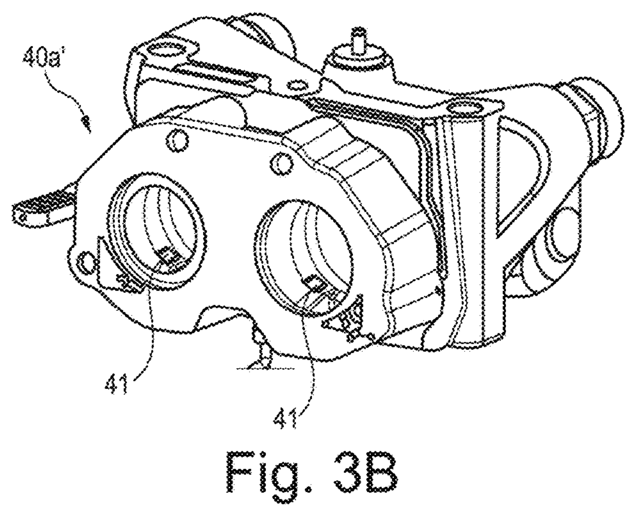
Figure 4:
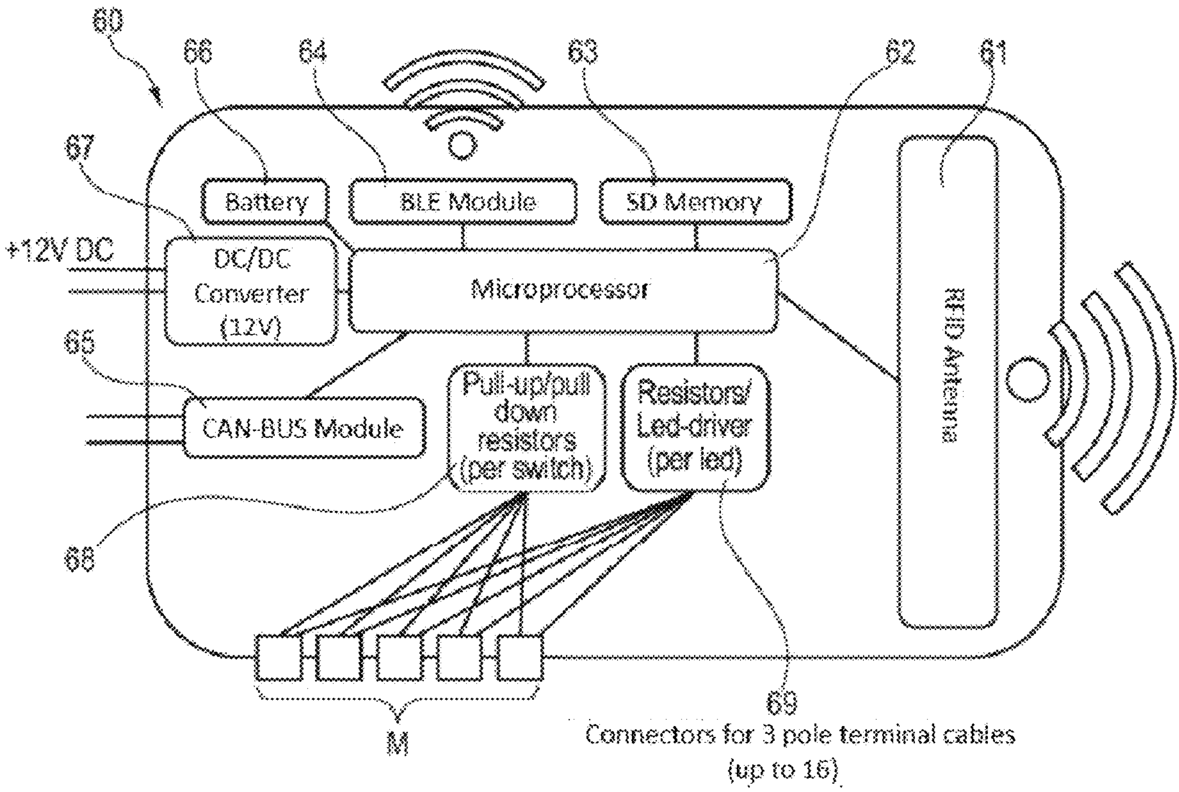
Figure 5:
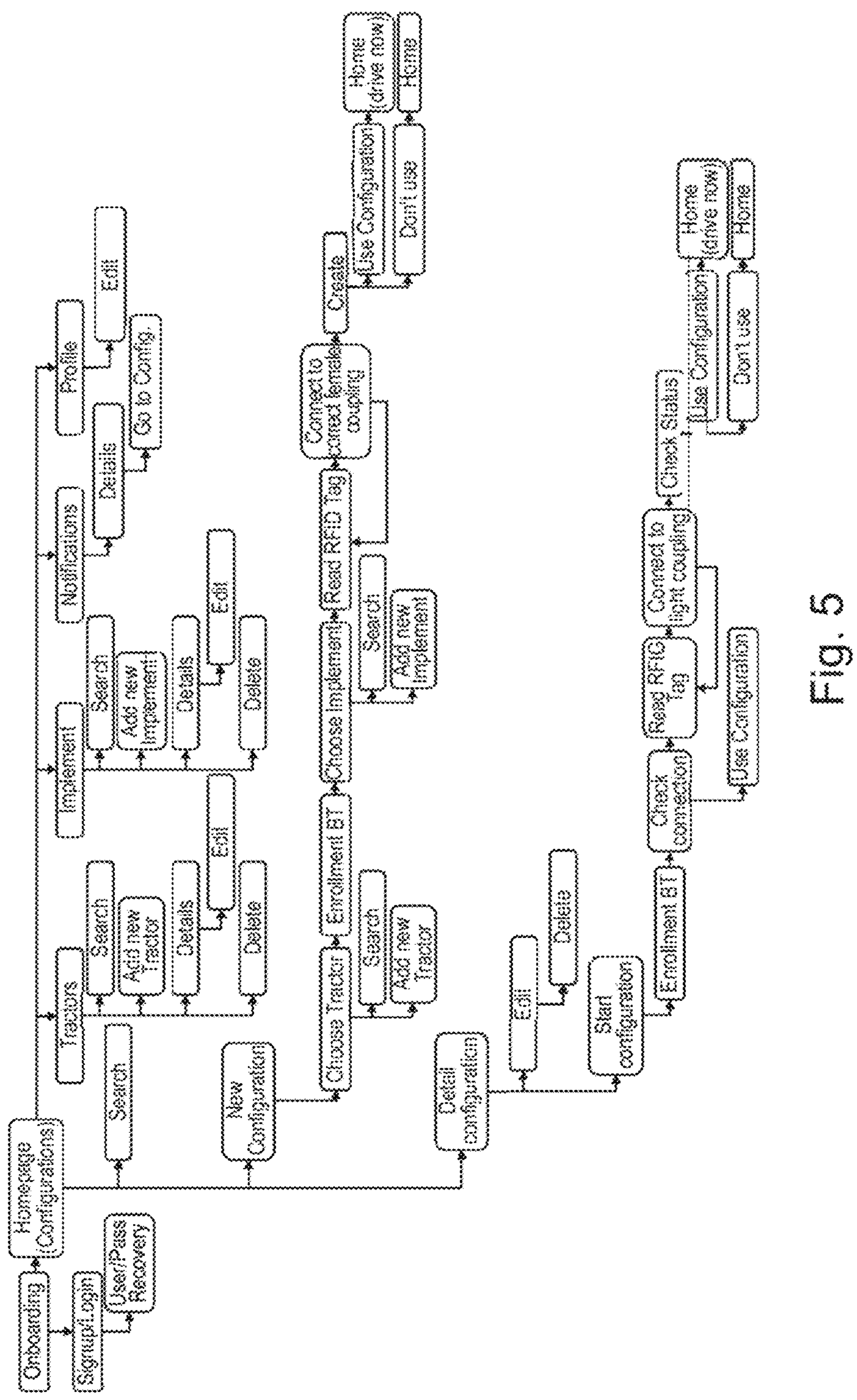

FIGS. 2B and 2C show possible embodiments of the means for unique identification of male couplings according to the present invention, for example located on user-graspable inserts for hydraulic lines on the utility side; in particular, FIG. 2B shows a possible embodiment in which said male coupling identification means comprise a button-like tag, integrated in a support similar to the prior art colored visual indicator as shown in FIG. 2A; FIG. 2C shows a possible embodiment in which said male coupling identification means comprise an RFID of "flexy" type, integrated inside the two half-shells of the hand grip;

FIGS. 3A and 3B show possible embodiments of the means for unique identification of the ports, respectively for single female coupling (FIG. 3A) and for a cast comprising two cartridges (FIG. 3B), the cast as shown in FIG. 3B being merely illustrated by way of example, as a number of different possible embodiments may be provided for cast iron items as typically used to accommodate the machine-side female couplings or cartridges, all of which may be equally used in the technical solution as described herein, which will be suitably sized for the specific shape of the cast;

Show 4 shows a diagram of the data transmission module according to the present invention;

FIG. 5 shows a simplified block diagram of the main functions that can be implemented through the software application (App) for mobile devices according to the present invention.

DETAILED DESCRIPTION OF THE INVENTION

Particularly referring to the accompanying figures, the apparatus 1 of the present invention affords monitoring and management of correct connection and operation of the hydraulic lines 30 that establish the connection between an operating machine 10 and a utility 20.

More particularly, the apparatus of the present invention addresses the control of the hydraulic connection between an operating machine 10, which in turn comprises a primary hydraulic circuit, and an apparatus or utility 20, which in turn comprises a secondary hydraulic circuit, wherein each of said hydraulic lines 30 establishes the connection between said primary hydraulic circuit of said operating machine 10 and said secondary hydraulic circuit of said utility 20 by means of quick couplings.

In particular, each of said hydraulic lines 30 comprises at least one quick coupling 30*a*. 30*b* which in turn consists of a female coupling or cartridge 30*a*, generally connected to the primary circuit of said operating machine 10, and a male coupling 30*b*, generally connected to the secondary hydraulic circuit of said utility 20.

Particularly referring to FIG. 2A, there is shown an example of prior art male coupling identification means, which use an identification insert 31 with a different color for each line identifier. This system is purely visual and does not allow any type of check on the correct match.

The apparatus 1 of the present invention comprises means 50*b*, 50*b*' for unique identification of each of said male couplings 30*b* which can be adapted to fit, for example, into the half-shells of the hand grip of an already existing male coupling 30*b*.

By way of example, with reference to FIGS. 2B and 2C, there are shown possible embodiments of the male coupling identification means 50*b*, 50*b*' which may comprise a button-like tag 50*b*, as shown for example in FIG. 2B, adapted to be integrated in the support to the known colored visual label as shown in FIG. 2A, or an RFID of "flexy" type 50*b*' respectively, integrated inside the two half-shells of the hand grip, as shown by way of example in FIG. 2C.

The apparatus 1 of the present invention further comprises means 40*a*, 40*a*' for identifying each of said female couplings or cartridges 30*a*, and a data transmission module 60 adapted to identify said male couplings 30*b* and to indicate to the user a correct or an incorrect match between said male couplings 30*b* and said female couplings or cartridges 30*a*, by guiding the user in connecting the lines 30.

Therefore, as described, said male coupling identification means 30*b* comprise at least one passive RFID TAG 50*b*, 50*b*' coupled to each of said male couplings 30*b* of each line 30, and said means for identifying each female coupling or cartridge 30*a* comprise at least one sensorized element 40*a*, 40*a*' coupled to each female coupling or cartridge 30*a* of each line. Preferably, said sensorized element 40*a*, 40*a*' comprises at least one microswitch 41 which is adapted to detect when correct connection of the male coupling 30*b* within the female coupling or cartridge 30*a* has occurred, and at least one visual signaling means 42 for indicating to the user a correct or incorrect match between a given male coupling 30*b* and that specific female port (coupling or cartridge) 30*a*.

Advantageously, said data communication module 60 is placed on board said machine 10 and comprises one or more RFID antennas 61 adapted to actuate said passive TAGS 50*b*. 50*b*' coupled to each of said male couplings 30*b* and to read the unique ID return signal emitted by the TAGS, and at least one microprocessor 62 in signal communication with said microswitch 41 and with said visual signaling means 42.

Said microswitch 41 is triggered when the male coupling 30*b* has been correctly connected oin the female port 30*a*. The microswitch 41 indicates that connection has occurred, whereas the microprocessor 62 detects whether the connection has been correctly established, with the visual signaling means 42 on said sensorized element 40*a*, 40*a*' guiding the user during the connection step. For example, said visual signaling means 42 provided at each machine-side female port (coupling or cartridge) 30*a* will comprise an LED light which turns on to indicate the correct port for connection of a given male coupling 30*b*. The antenna 61 receives the ID return signal from the passive TAG on the male coupling and communicates the identification of the male coupling to the microprocessor 62 which, with the configuration stored therein, identifies the correct port 30*a* on the machine side to guide the operator in performing the correct hydraulic connection.

Then, the microswitch 41 indicates whether the connection between the male and the female couplings has been correctly made.

Therefore, the apparatus 1 of the present invention provides a recognition system which, in the preferred embodiment as described herein by way of example also with reference to the accompanying figures, is based on the RFID technology, which includes remote recognition of a passive TAG provided on each male coupling 30*b* associated with each hydraulic line of the utility, by means of a signal emitted by the RFID antenna 61 of said data communication module 60, said antenna 61 being adapted to actuate the passive TAGs 50*b*, 50*b*' provided on each of said male couplings 30*b* and to read the unique ID return signal emitted by said TAGs.

Advantageously, as shown in the accompanying figures, said data communication module 60 further comprises a memory unit 63 adapted to store the data concerning the correct configuration of the hydraulic lines 30, such as the different machine/utility matches (i.e. tractor X with implement Y), and all the matches of each coupling/pipe of the implement with the relevant tractor port (as first dictated by the "expert" user), whereas system alarms are given by the microprocessor to the APP via a Bluetooth connection, so that the user is informed about a correct or incorrect match of a male coupling 30*b* to a female coupling or cartridge 30*a*.

Preferably, said data communication module 60 is configured to communicate data to and from an electronic device 70 in which management software is installed. Even more preferably, said electronic device 70 may consist of a mobile device such as a tablet or a smartphone, and said management software may consist of an application (App) for mobile devices.

The data communication module 60 will further comprise a Bluetooth transmission adapter 64 for data communication to and from said electronic device 70 in Bluetooth mode, so that the user can receive information about coupling of the hydraulic lines directly on his/her mobile device.

Therefore, as mentioned above, the apparatus 1 of the present invention comprises the following macro-components:

- a RFID- and Bluetooth-based data communication module 60;
- a sensorized element 40*a*, 40*a*' coupled to each port comprising the female coupling or cartridge 30*a* of each line 30 on the machine side;
- means for identifying each male coupling 30*b* which comprise at least one passive TAG 50*b*, 50*b*' mounted at the male coupling.

Advantageously, the apparatus of the present invention further comprises a software application (App), preferably for mobile devices, for managing the data of the lines of a plurality of operating machines and utilities.

Moreover, still according to the preferred embodiment of the present invention as described herein by way of example, the apparatus may further have a remote platform 80, in data communication with the mobile device 70, for storing and managing data, which may consist for example of a cloud server or a remote PC, said data storage and management platform 80 being in data communication with said mobile device 70, preferably not via a network connection, so that the data of the couplings and the connections of the various hydraulic lines 30 of the operating machines 10 and of the various utilities 20 sent from said data communication module 60 to the management software consisting of said application or app for mobile devices, or directly entered by the operator into said App, is sent to said remote platform 80 where such data may be used by the user to monitor the use of the entire hydraulic system, i.e. the primary and secondary hydraulic circuits, the hydraulic connection lines and their coupling. The machines on which the system is installed may be identified, and the data concerning the operation of the entire system, such as the operating pressures of the machine, the utilities and, of course, the couplings, can be received thereby. Such data may be loaded by manual input by the user, if the machine is not equipped with a CAN bus line, or via the CAN bus line itself, since a CAN bus interfacing card is provided in RFID module. The data so collected may be suitably processed by suitable algorithms to obtain statistics, to generate predictive maintenance analyses, both for the couplings (if identified and entered by the operator, for example during data entry during first setup of the App) and for the machines.

That is, the specially designed App developed by the Applicant advantageously affords the performance of at least the operations of:

- Registering and signing in with a personal utility profile (used ID and password);
- Managing the type of utility (also providing any privileges and/or features to App users);
- Entering the data of operating machines and implements;
- Creating customized fleets of machines and implements;
- Creating and saving specific match configurations of a given machine with a given implement or utility, such matches being associated with a corresponding matrix which matches the utility-side male couplings with the corresponding machine-side ports (female couplings or function block cartridges);
- Obtaining a support (App-based) during the first line/port matching step and subsequent guided connections of the lines;
- Entering data about the implement being connected;
- Receiving warning messages concerning connection errors or system malfunctions;
- Transferring the information managed by the App to the remote data storage and management platform.

The software application, also briefly referred to as App herein, has been conceived and developed by the Applicant preferably for mobile devices such as smartphones or tablets and implements a plurality of functions which can provide support to the end user during the use of the entire apparatus by displaying and managing information and multiple functions.

In addition to the above, the App allows the user to create his/her own fleet of machines and utilities by entering the relevant data.

As shown for example with reference to the diagram of FIG. 5, dedicated menus may be used by the user to enter new machines or search for existing machines ("Tractors"), and enter new utilities or search for existing utilities ("implements").

In addition to being able to create his/her own fleet of machines and utilities, the user may perform the first configuration step ("new configuration") and directly enter at this stage a new machine ("add new tractor") or search ("search") from previously entered machines or possibly from those available in the database of the portal or dedicated website on the cloud or on a remote server, which machines (tractors and equipment) will be entered and validated by an "Administrator" user (e.g. the present Applicant Faster, owner of the software/app), or created by each user and later approved by the "Administrator" user.

This applies to both tractors and implements, and does not apply to configurations, as the X tractor/Y implement matches and their connections are performed by each individual user, who may also enter a new utility ("add new implementation") or search ("Search") for a previously entered utility, and may enable the Bluetooth connection with the RFID module 60 ("enrolling BT") for data connection between the App installed on the device 70 and the RFID module 60.

Now, the user may allow the system to read the TAG on the utility lines, via the RFID module 60 and the App, ("read RFID Tag") and to uniquely associate the ID of the Tag on the male coupling of the utility-side line with the correct machine-side port ("Connect to correct female coupling"). The association between the correct ID TAG of the utility-side male coupling with the correct female port on the machine side requires the physical coupling of the couplings by the operator on the machine.

Then, the matches between each male and female ports are saved as the correct configuration using the App.

Additional operations that can be implemented through the App are storage of data of possible implement accessories or (optional) entry of the types of couplings associated with the connected line.

A previously stored configuration may also be retrieved, and the correctness of all line/port matches can be checked in real time (on time).

The App will suitably generate and display warnings and alerts for:

line entry errors;

internal system errors;

and may generate an acknowledgement signal to inform the operator that all the lines are correctly connected and the work of the operating machine and the utility may begin.

As described above, data can be saved directly via the App to a memory card in the RFID module 60, or via smartphone connection and/or can be sent to said remote platform 80 on which said dedicated portal or website is implemented for further data processing and management with the other purposes that have been briefly described.

Thus, the apparatus 1 of the present invention allows the user to create the first match of each hydraulic line of a utility with each corresponding port (with a single female coupling or with cartridges inserted in blocks or manifolds) on the machine side. Due to the large number and high variability of the types of tractors, the hydraulic ports mounted thereupon, implements, and types and number of hydraulic lines of the implements, during the first configuration the first match can be made by the user (deemed to be "expert"), who has the technical knowledge of his/her own machines and the best combination of lines and ports, as stored by the software. Alternatively, for more complex machines, the match mat be generated by the CAN bus connection between the machine and the implement (if any).

In the case of a CAN bus connection, information about the particular implement to be connected (working pressures, flow rates, power required, etc.) may be transferred to the machine via this connection. This information may be used by the machine to manage optimized use of the implement (power optimization, fuel saving, etc.).

Even without a CAN bus connection to the implement, the user can use the App to manually enter the same operating parameters that would be entered into the system from the CAN bus network via the App. Thus, the system of the present invention may be also applied to older machines and equipment by simply installing the RFID communication module 60 and the sensorized elements 40*a*, 40*a'* on board the machine for coupling to each female coupling or cartridge 30*a* of each line on the machine side.

The data communication module 60 may be advantageously placed, as mentioned above, on board the machine and will preferably comprise the following components:

one or more RFID antennas 61;

the control electronics for the antenna(s);

a microprocessor card 62;

a Bluetooth BLE module or adapter 64;

a data storage card (with SD card) 63;

a CAN-bus card 65;

a buffer battery (optional) 66;

a DC/DC converter card 67;

a pull-up resistor board 68 for connection to the microswitches 41;

a LED driving transistor board 69;

one or more terminal blocks (M) for external connection or alternatively male/female connectors for each peripheral line.

Connectivity between the RFID data transmission module 60 and the peripherals, as well as between the module 60 and the operating machine 10 on which it is mounted and from which it receives its power supply, is provided by a physical connection, preferably a cable. Alternatively, the connections between the module 60 and each peripheral sensorized element 40*a*, 40*a'* might still be established in WiFi or Bluetooth mode. Here, each sensorized peripheral element 40*a*. 40*a'* provided on each port should be powered autonomously, with a battery for each peripheral element, and be equipped with dedicated data transmission electronics.

Conversely, the connection between the module 60 and the passive TAGs 50*b*, 50*b'* coupled to each of said male couplings 30*b* of the hydraulic lines on the utility side is provided through the RFID connection.

The connection between the communication module 60 and the device 70, preferably a mobile device such as a tablet or smartphone of the operator on which the software application is installed, is preferably established, as mentioned above, via Bluetooth.

Data is preferably communicated between said mobile device 70 and the corresponding App and the remote data storage and management platform 80, as mentioned above, via the data communication network.

In case of CAN bus connectivity, the flow of data may be also designed for further equipment and functions of the machine and the implements, not only for the hydraulic lines but also to provide said remote platform 80 with additional data such as geolocation, working hours, and so on, which may be useful in predictive maintenance or in determining the reasons for any failure of couplings.

Concerning the means for identifying each female coupling or cartridge 30*a*, or more generally the machine-side port, they preferably comprise, as mentioned above, at least one sensorized element 40*a*, 40*a'* which consists of an element that can be installed on female couplings or manifolds comprising a plurality of female cartridges installed on the operating machine, e.g. consisting of a tractor.

At present, oil collecting caps (for couplings) and dust covers (for casts) are already present on manifold couplings or cartridges, as accessories.

A possible preferred embodiment of the sensorized elements 40*a*, 40*a'* of the present invention can therefore consist of a special oil-collecting cap 40*a* in the case of individual couplings, and in a special protective cover 40*a'* in the case of cartridges of a cast or manifolds.

Referring to FIG. 3, unlike simple prior art oil-collecting caps or protective covers, the sensorized elements 40*a*, 40*a'* of the present invention comprise at least one microswitch 41 and at least one LED light 42, both electrically connected to the RFID module 60. The LED light 42 specific to a given hydraulic port is switched on by the module 60 to indicate the correct port for coupling to the male coupling 30*b* of the hydraulic line of the implement, identified by means of the RFID TAG 50*b*, 50*b'* associated therewith. The microswitch, suitably placed inside the cap or protective cover-shaped sensorized element 40*a* 40*a*', closes a contact when the male coupling 30*b* is correctly inserted in the machine-side port. By being electrically connected to the data transmission module 60, the microswitch 41 indicates to the user that the male coupling has been correctly inserted into the port.

Referring to FIG. 2, the passive TAGs 50*b*, 50*b*' coupled to each of said male couplings 30*b* of the utility-side hydraulic lines can be provided in different forms, such as a plate 50*b* or an adhesive label 50*b*' inside which the electronic circuitry is embedded, for generating the unique ID and to transmit the latter to the module 60 when passively actuated, by induction, by the electromagnetic field emitted from the RFID antenna 61. Passive TAGs do not need to be powered.

The passive TAG may be installed directly near the male coupling of each line, or inside an accessory (such as an ergonomic hand grip designed by the Applicant hereof for easier line gripping) which is in turn installed on the line. Installation on an accessory facilitates installation (and possible replacement in case of breakage) of the TAG by the end user.

The TAG returns the unique code and the system electronics may associate information with this code, such as the identification of the correct connection port on the machine side; the name or description of the line; any other identification information of the implement for that hydraulic line (type of implement, trademark, model, line or implement operating parameters in general).

The present invention also relates to a method of monitoring and managing correct connection and operation of hydraulic lines 30 which connect the primary hydraulic circuit of an operating machine 10 with the secondary hydraulic circuit of a utility 20, wherein the connection of each of said hydraulic lines 30 is made by means of ports comprising a female coupling or cartridge 30*a* on the machine side of said line 30 which is adapted to accommodate a corresponding male coupling 30*b* provided on the utility side of said line 30, including at least the steps of:

- providing an apparatus 1 as described hereinabove;
- configuring said software application or App by entering the data of the operating machines ("Tractors") and the utilities ("Implements");
- performing the first configuration step ("new configuration") by manually coupling the correct male coupling 30*b* on the utility side that supports the corresponding passive TAG 50*b*, 50*b*' with the correct female port 30*a* on the machine side and saving this correct configuration by the App;
- repeating the configuration operation until the first configuration of all the hydraulic lines 30 has been completed;
- establishing the Bluetooth connection ("enrolling BT") between the RFID module 70 for data connection between the App installed on the device 70 and the RFID module 60;
- connecting the user 20 to the operating machine 10 by moving a male coupling 30*b* of the lines of said utility toward the machine-side female ports 30*a;*
- emitting an electromagnetic field via the antenna 61 of said RFID module 60 and reading the return signal emitted by said passive TAG 50*b*, 50*b*' associated with said male coupling 30*b;*
- through the microprocessor 62 connected to said RFID antenna 61, sending a signal to a LED-driving transistor board 69 to cause the LED 42 corresponding to the correct port to be turned on, thereby guiding the user in connecting the hydraulic line;
- from a signal sent by said microswitch 41 to said microprocessor 64 through said pull-up resistor board 68, detecting the correct connection state of the male couplings 30*b* within the female ports 30*a*.

The method of the present invention may also comprise an additional step of sending the data and configurations of the couplings of the lines 30 as stored via said App installed on said mobile device 70 to a remote data storage and management platform.

The apparatus 1 and the method of the present invention have been thus shown to perform the task and fulfill the intended objects of the invention.

More particularly, the above description proves that the apparatus and method of the present invention are able to guide the user in correctly connecting the hydraulic lines of a utility to the hydraulic circuit of an operating machine.

Also, with to the present invention, and in particular with the dedicated software application that can advantageously be implemented in the form of Apps for mobile devices, the operator may be guided in correctly coupling different utilities to the same or to different operating machines, thereby facilitating connection operations even with a large number of fleets.

Furthermore, as shown above, the apparatus and method for monitoring and managing correct connection and operation of the hydraulic lines of a machine/utility match according to the present invention can also monitor the data of further equipment and functions of the machine and the implement, not only related to the hydraulic lines, as additional data may be also detected and provided to said remote platform 80, such as geolocation, working hours, and so on, which may be implemented by means of suitable sensors in a CAN bus architecture connected to said data transmission module 60 and sent through said App in order to derive useful information for predictive maintenance or to determine the reasons that might have caused a possible failure of the couplings.

The present invention has been described by way of illustration and without imitation, according to preferred embodiments, but it shall be understood that variations and/or changes may be made by a skilled person, without departure from the inventive scope, as defined in the accompanying claims.

The invention claimed is:

1. An apparatus (1) for monitoring and managing a correct connection and operation of hydraulic lines (30) that establish a connection of a primary hydraulic circuit of an operating machine (10) with a secondary hydraulic circuit of a utility (20), said apparatus comprising:

- a plurality of ports comprising a female coupling or cartridge (30*a*) on a machine side of a hydraulic line (30), the plurality of ports being each adapted to accommodate a male coupling (30*b*) provided on a utility side of said hydraulic line (30) for the connection of each of said hydraulic lines;
- means (50*b*, 50*b*') for identifying each of said male couplings (30*b*); and
- means (40*a*, 40*a*') for identifying each of said plurality of ports that comprise said female couplings or cartridges (30*a*); and
- a data communication module (60) provided on said operating machine (10) for identifying said male couplings (30*b*) as said male couplings are being moved toward said ports (30*a*) and for indicating to a user a correct port for hydraulic coupling between said male couplings (30*b*) and said female couplings or cartridges (30*a*), thereby guiding the user in operations to connect lines (30), wherein said means (50*b*, 50*b*') for identifying each of said male couplings (30*b*) comprise at least one passive RFID TAG (50*b*, 50*b*') coupled to each of said male couplings (30*b*) of each hydraulic line (30), wherein said means (40*a*, 40*a*') for identifying each of said plurality of ports comprising the female coupling or cartridge (30*a*) comprise at least one sensorized element (40*a*, 40*a*') coupled to each port and at least one microswitch (41) adapted to detect that the correct connection of the male coupling (30*b*) into the female coupling (30*a*) has occurred, and at least one visual signaling means (42) for indicating to the user which machine-side port has to be coupled to the male coupling (30*b*) of the utility, and wherein said data communication module (60) is placed on board said operating machine (10) and comprises one or more RFID antennas (61) adapted to actuate said passive RFID TAGS (50*b*, 50*b*') coupled to each of said male couplings (30*b*) and to read a unique return ID signal emitted by each of said RFID TAGs, and at least one microprocessor (62) in signal communication with said at least one microswitch (41) and with said visual signaling means (42); and a remote platform (80); and an electronic device (70) in data communication via a network connection with said remote platform (80) so that data concerning couplings and connections of the hydraulic lines (30) of the operating machines (10) and of various utilities (20) sent by said data communication module (60) to a management application (App) for mobile devices (70) may be used to monitor modes of use of an entire hydraulic system.

2. The apparatus (1) as claimed in claim 1, wherein said data communication module (60) further comprises a memory (63) for storing data about a configuration of the hydraulic lines (30) as set by the user, so that the user may be warned about a match of a male coupling (30*b*) to a female coupling or cartridge (30*a*) not corresponding to a stored configuration.

3. The apparatus (1) as claimed in claim 2, wherein said one or more RFID antennas (61) are configured to receive an ID return signal from the at least one passive RFID TAG provided on said male coupling (30*b*) and to communicate an identification of the male coupling (30*b*) to the at least one microprocessor (62) which identifies, based on the configuration stored in the memory, a correct female coupling or cartridge (30*a*) on the machine side to guide the operator in making a correct hydraulic connection.

4. The apparatus (1) as claimed in claim 3, wherein said visual signaling means (42) provided at each female coupling or cartridge (30*a*) on the machine side comprise an LED light for indicating the correct female coupling or cartridge (30*a*) to which a given male coupling (30*b*) is to be connected, the LED light (42) corresponding to a correct port (30*a*) being turned on by a signal sent to a transistor board (69) for driving the LED lights through the at least one microprocessor (62) connected to said RFID antenna (61), to guide the user in connecting a correct hydraulic line.

5. The apparatus (1) as claimed in claim 1, wherein said data communication module (60) is in said data communication with said electronic device (70).

6. The apparatus (1) as claimed in claim 5, wherein said electronic device (70) consists of a mobile device, and wherein said management application (App) consists of an application for mobile devices.

7. The apparatus (1) as claimed in claim 6, wherein said data communication module (60) further comprises a Bluetooth transmission adapter (64) for the data communication to and from said electronic device (70).

8. A method of monitoring and managing correct connection and operation of hydraulic lines (30), which establish a connection of a primary hydraulic circuit of an operating machine (10) with a secondary hydraulic circuit of a utility (20), wherein the connection of each of said hydraulic lines (30) is made by ports comprising a female coupling or cartridge (30*a*) on a machine side of one of said hydraulic lines (30), which is adapted to accommodate a male coupling (30*b*) provided on a utility side of said one of said hydraulic lines (30), the method comprising at least the steps of:

providing an apparatus (1) as claimed in claim 1;

configuring said apparatus (1) to comprise the electronic device (70) with the management application (App) installed thereon, by entering the data concerning operating machines and utilities;

establishing a Bluetooth connection between the data communication module (60) and said electronic device (70) for data connection between the App installed on said electronic device (70) and said data communication module (60);

performing a first configuration step to develop a new configuration by manually coupling a correct utility-side male port (30*b*) which supports a corresponding passive RFID TAG (50*b*, 50*b*') with a correct machine-side female port (30*a*) and saving the new configuration using the App or, for a pre-connected operating machine, acquiring a machine/implement first configuration data by connection to a CAN bus line of the pre-connected operating machine;

repeating the first configuration step until the first configuration of all hydraulic lines (30) has been completed;

connecting the user (20) to the operating machine (10) by moving a male coupling (30*b*) of the hydraulic lines of said utility toward the machine-side female ports (30*a*);

emitting an electromagnetic field via the RFID antenna (61) and reading a return signal emitted by said corresponding passive RFID TAG (50*b*, 50*b*') associated with said male coupling (30*b*);

through said at least one microprocessor (62) connected to said RFID antenna (61), sending a signal to a LED-driving transistor board (69) to cause a LED (42) corresponding to the correct port to be turned on, thereby guiding the user in connecting the hydraulic line; and from a signal sent by said at least one microswitch (41) to said at least one microprocessor (64) through a pull-up resistor board (68), detecting a correct connection state of the male couplings (30*b*) within the female ports (30*a*).

9. The method as claimed in claim 8, further comprising a step of sending the data concerning couplings and connections of the hydraulic lines (30) and matching configurations of the hydraulic lines (30) as stored on said App installed on said electronic device (70), which is configured as a mobile device (70), to a remote data storing and management platform.

* * * * *